United States Patent [19]

Carollo et al.

[11] 4,295,159

[45] Oct. 13, 1981

[54] LIGHT PROJECTION SYSTEM

[75] Inventors: Jerome T. Carollo; Joseph Barbarasch, both of Ormond Beach, Fla.

[73] Assignee: General Electric Company, Syracuse, N.Y.

[21] Appl. No.: 156,685

[22] Filed: Jun. 5, 1980

[51] Int. Cl.³ ............................................. H04N 5/74
[52] U.S. Cl. ...................................... 358/22; 358/60; 358/231; 358/236
[58] Field of Search .................... 358/22, 21 R, 56, 59, 358/60, 61, 64, 230, 231, 232, 236, 183; 353/30, 31, 34, 37; 350/359, 361, 330, 266

[56] References Cited

U.S. PATENT DOCUMENTS

| | | | |
|---|---|---|---|
| 4,110,791 | 8/1978 | Rosendahl | 358/232 |
| 4,127,322 | 11/1978 | Jacobson et al. | 358/59 |
| 4,167,019 | 9/1979 | Shepperd | 358/22 |
| 4,210,928 | 7/1980 | Ohmori | 358/60 |

Primary Examiner—Jin F. Ng
Assistant Examiner—Michael A. Masinick
Attorney, Agent, or Firm—Carl W. Baker; Richard V. Lang

[57] ABSTRACT

Apparatus and method are disclosed directed to a real time, electro-optical light projection system, wherein at least one selected target is displayed on a high resolution mini-raster, differentiated from a coarse resolution base raster background. A full color display of the target on a full color background is provided with three cathode ray tubes in association with corresponding liquid crystal light valves. Alternatively, a single cathode ray tube and an associated liquid crystal light valve are used to display the target monochromatically against a monochromatic background.

12 Claims, 9 Drawing Figures

LIGHT PROJECTION SYSTEM

The present invention relates in general to new and improved light projection systems, in particular to an improved, real time, electro-optical light projection system in which at least one selected target is displayed in high resolution detail against a low resolution background and wherein the target and the background are both portrayed in a chromatically comparable manner, either in full color or monochromatically.

BACKGROUND OF THE INVENTION

Cathode ray tubes are used extensively for converting electrical signals into a visible image on the face of the tube. They possess the advantage of very high writing speeds which permit the representation of real time information. Since the display itself is relatively small, viewing must be done close up to the tube. Thus, the audience to which the information can be displayed at any given time is limited. Viewing by a large group of people is not possible, particularly in an area where a reasonable amount of ambient illumination must be maintained.

Past attempts at providing a bright display which is at least several feet high have met with varying degrees of success. One promising approach, shown in U.S. Pat. No. 4,127,322, provides a light projection system which employs cathode ray tubes in association with liquid crystal light valves. The light emitted by a bright source of light is controlled and is ultimately projected onto a viewing screen. Each cathode ray tube is used in association with an AC driven, field effect mode, birefringent liquid crystal light valve, wherein the polarization of the projection light from the light source is modulated in response to the low level light image on the face of the cathode ray tube. By using one cathode ray tube and an associated light valve for each primary color, a full color, real time image is produced on a large projection screen, suitable for group viewing.

The detail with which an image is portrayed to the human eye is determined by the "resolution" capability of the image reproducing system, i.e. by the number of recognizable basic picture elements that can be reproduced. The detail perceived from the image is determined in terms of both vertical and horizontal resolution. In a CRT, the beam deflection means typically causes the electron beam of the tube to sweep periodically through a raster pattern. The beam intensity is controlled concurrently with the sweep, so as to control the intensity of the CRT scanning spot responsible for the visible trace of the image on the face of the tube. Horizontal resolution is a function of the number of picture elements that are generated per unit of horizontal distance swept by the beam, as well as of the shape of the scanning spot itself which is controlled through beam focusing means. Vertical resolution depends on the number of horizontal sweep lines of the raster pattern per unit of vertical distance. To increase the resolution of a CRT which has a sharply focused beam, the number of picture elements, as well as the number of horizontal lines, must be increased per unit of horizontal and vertical distance respectively.

It is sometimes advantageous to display one or more portions of the projected image with greater resolution than the surrounding background. This may be done for the purpose of studying the image portion in question and/or to differentiate it from its background. Such viewing of the image is particularly desirable in certain radar applications, such as radar simulation, where one or more selected targets in the sector covered by the radar beam at any given movement may be of particular interest to the viewer. As used herein, the term "target" is intended to indicate that portion of the total image on the viewing screen, which is singled out for detailed display against its surrounding background.

In one embodiment of the electro-optical light projection system disclosed in the aforesaid patent, an additional cathode ray tube and an associated liquid crystal light valve are used to provide a monochromatic, black and white overlay image on the full color background image displayed on the projection screen. It has been proposed to use such an arrangement to display a target in high resolution detail against its low resolution background. To do so, a monochromatic mini-raster can be used, which has a greater number of picture elements and horizontal lines respectively, per unit length than the equivalent parameters of the base raster that forms the background image. Further, since the target occupies only a small portion of the total displayed image, the number of horizontal lines that are used for the mini-raster, as well as its sweep angle on the face of the tube, are both small with respect to the corresponding base raster dimensions.

The arrangement described has a number of disadvantages which limit its utility to a narrow range of situations. One problem arises from false target cues produced by the unnatural color contrasts between the monochromatic mini-raster overlay on the full color background, which may portray blue sky, green grass, etc. Such cues are likely to confuse rather than educate the observer about the target and its background. Another problem arises from the inability to distinguish with clarity any but the brightest targets from their background. A further drawback is the requirement for an additional cathode ray tube and liquid crystal light valve to produce the overlay. The added equipment not only raises the cost of what is already an expensive system, but it materially increases its complexity. This is due to the added timing and image positioning requirements which add to the difficulty of maintaining the system in proper working order.

OBJECTS OF THE INVENTION

It is a primary object of the present invention to provide a new and improved light projection system and method for operating the same which are not subject to the foregoing disadvantages.

It is another object of the present invention to provide an electro-optical, real time projection system and method for operating the same, capable of displaying a target in high resolution detail against a low resolution background, whereby false target cues to the observer are avoided.

It is a further object of the present invention to provide an electro-optical, real time light projection system and method for operating the same, capable of displaying a target in high resolution detail against a chromatically comparable low resolution background, whereby targets are adequately displayed regardless of their brightness.

It is still another object of the present invention to provide an electro-optical light projection system capable of displaying a target in high resolution detail against a low resolution background, which requires less equipment and which is simpler to operate and maintain than heretofore available systems of this type.

It is still a further object of the present invention to provide a light projection system using three cathode ray tubes and their associated light valves to display a full color target in high resolution detail, differentiated against a full color, low resolution background.

It is yet another object of the present invention to provide a light projection system using a single cathode ray tube and an associated light valve, capable of displaying a target monochromatically in high resolution detail, differentiated against a monochromatic, low resolution background.

DESCRIPTION OF THE INVENTION

Figure 1:
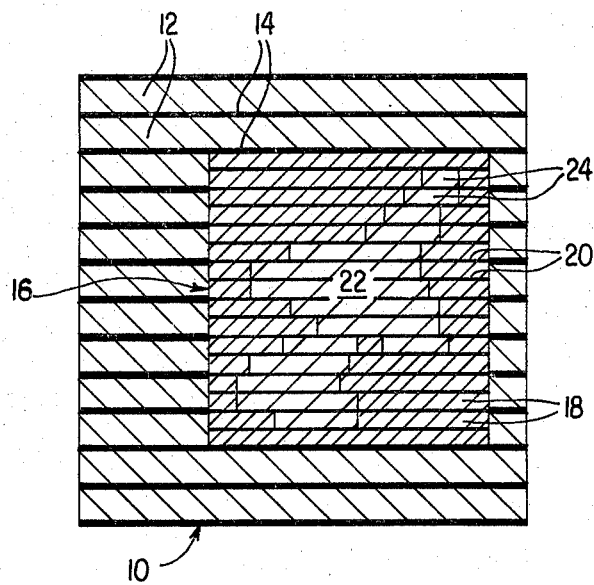
FIG. 1 illustrates the visual effect of using a monochromatic, high resolution mini-raster to display a target monochromatically against a full color, coarse resolution base raster background, using an overlay technique.
Figure 7:
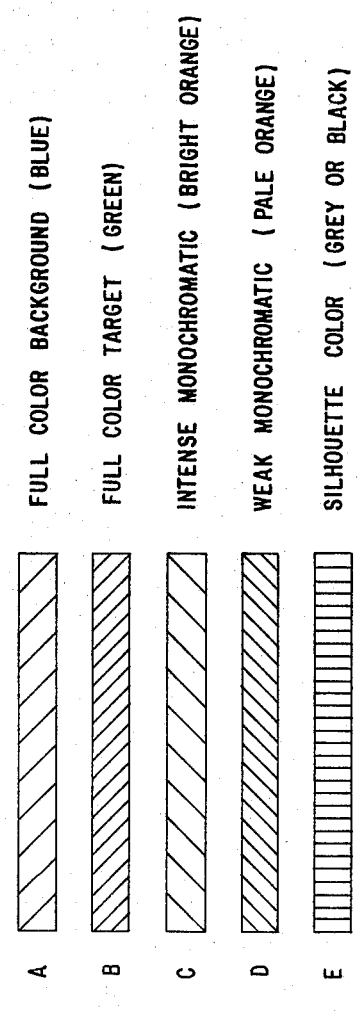
FIG. 7 illustrates different kinds of shading used to denote various colors in FIGS. 1, 2, 3 and 6.

The technique of writing a monochromatic image as an overlay on a full color background as disclosed in U.S. Pat. No. 4,127,322, presents a number of problems which limit the utility of such an approach, as discussed above. FIG. 1 illustrates the visual effect of using the overlay technique to provide a monochromatic mini-raster for presenting monochromatic target information on a full color background. The colors represented by the various shadings in FIG. 1 and in subsequent Figures are explained in FIG. 7. A base raster, designated generally by reference numeral 10, comprises raster lines 12 separated by spaces 14. For the purpose of the present explanation and without limitation, the base raster represents the background seen by a radar beam, such as the sky. Raster lines 12 are accordingly shaded for blue, as further shown in FIG. 7. Under ordinary conditions, the base raster occupies the full area of the tube face, or at least a major portion thereof.

A restricted portion of the background represented by base raster 10 contains an overlay in the form of a mini-raster 16, comprising mini-raster lines 18 separated by spaces 20. The mini-raster overlay 16 is displayed monochromatically, as is the case for the overlay in U.S. Pat. No. 4,127,322. However, to distinguish the different color shadings herein, mini-raster lines 18 are shaded for a pale monochromatic orange, rather than for the black and white overlay colors indicated in the patent. These raster lines and the spaces between them, are seen to be narrower than base raster lines 12 and spaces 14, so that the number of mini-raster lines per unit vertical length is greater than the number of base raster lines for the same unit length. Hence, for the reasons explained above, the resolution of the image portrayed by the mini-raster is higher than that of the background displayed by the base raster. The target, indicated generally at 22 in mini-raster 16, is displayed in the same manner, by intensity variations of the monochromatic color. Thus, the target portions 24 of the mini-raster lines in FIG. 1 are shown uniformly shaded for intense (bright) monochromatic orange against the pale orange mini-raster lines 18. It will be clear, however, that the color intensity of the target will not necessarily be uniform throughout.

As previously explained, the image of one or more selected targets may be represented in high resolution detail as an overlay on the coarse resolution background image. Thus the mini-raster, and hence target 22, may take up only a portion of the area of base raster 10, the latter displaying the full color(s) of whatever background is seen by the radar beam, such as blue in the example under consideration. The monochromatic representation of the mini-raster inset against a background represented in full color makes it difficult to assess the true value of the target portrayed by the mini-raster. Specifically, unnatural color contrasts occur which are visually misleading and which tend to give incorrect target cues to the viewer.

Figure 2:
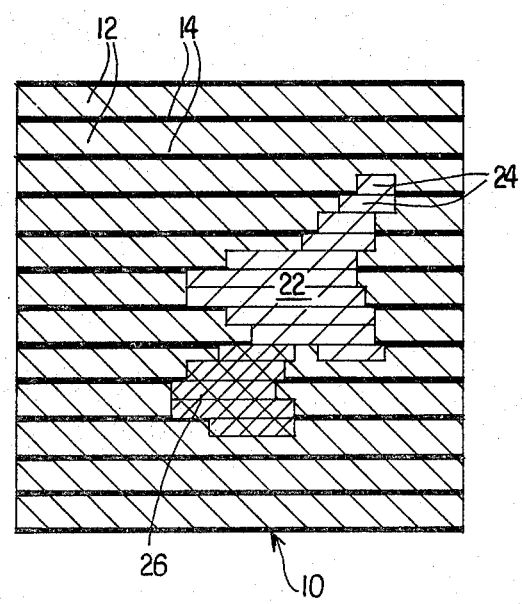
FIG. 2 illustrates the visual effect of using a monochromatic, high resolution mini-raster trimmed to the target silhouette, to display a target monochromatically against a full color, coarse resolution base raster background using an overlay technique.

One technique proposed for reducing the magnitude of the problem is to trim away, i.e. blank out, that portion of the mini-raster which falls outside the silhouette of the target itself. The visual effect of applying this technique is illustrated in FIG. 2, where applicable reference numerals have been retained as far as possible. As shown, the bright orange line portions 24 which portray the target, are now juxtaposed directly against base raster lines 12. This technique works well only in a limited range of applications, specifically when the target is bright compared to its background. If such is not the case for the entire target, the bright background tends to bleed through the pale target portion superimposed thereon by the aforesaid overlay technique. In the example illustrated in FIG. 2, target area 26 is assumed to have a weak monochromatic color and it is shaded for pale orange. As will be seen from the drawing, background lines 12 are visible through area 26 and tend to obscure this portion of the target. In extreme instances the target may be completely washed out by a bright background. Thus, since many targets, such as airplanes or the like, do not present a bright picture, the technique illustrated in FIG. 2 has utility only for a limited range of applications.

Figure 3:
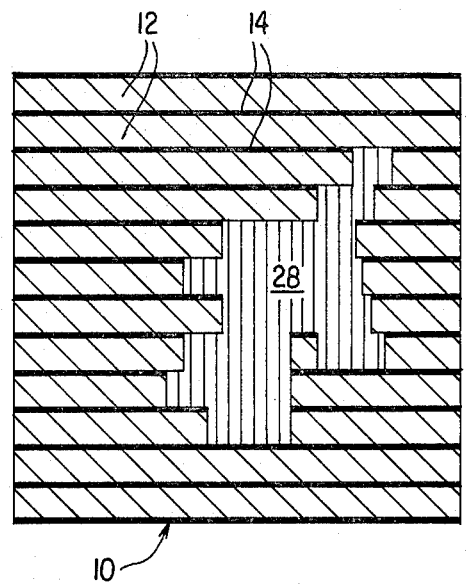
FIG. 3 illustrates the visual effect of displaying a target monochromatically against a full color, coarse resolution base raster background by using an overlay technique in which a target-conforming silhouette is cut into the base raster background.

In order to cope with the problem of bleed-through and wash-out for dark targets such as airplanes and the like, it has been proposed to blank out the portion of the base raster area which is coincident with the target, so that the target will appear as a dark silhouette only. This is illustrated in FIG. 3, where the target silhouette, designated by the reference numeral 28, is shaded for gray or black. In addition to the fact that the target so portrayed fails to reveal any target details within its silhouette 28, it will be noted that the resolution of the target silhouette is limited by the coarse resolution of the base raster. Thus, the target outline cannot follow the variations represented by the high resolution miniraster, e.g. as shown in FIGS. 1 and 2. Accordingly, such an approach fails to serve the purpose of the miniraster, which is to portray the target in high resolution detail against a low resolution background. Hence the added complexity and cost of so implementing the display, which requires an additional cathode ray tube and its associated liquid crystal light valve, produces no commensurate benefit.

It thus becomes clear from a consideration of FIGS. 1-3 and from the discussion above, that the use of an overlay technique to produce a monochromatic, high resolution target image on a full color, coarse resolution background image has utility only for a limited range of operations, specifically where the target image is sufficiently bright so as not to be washed out by a bright background.

Figure 4:
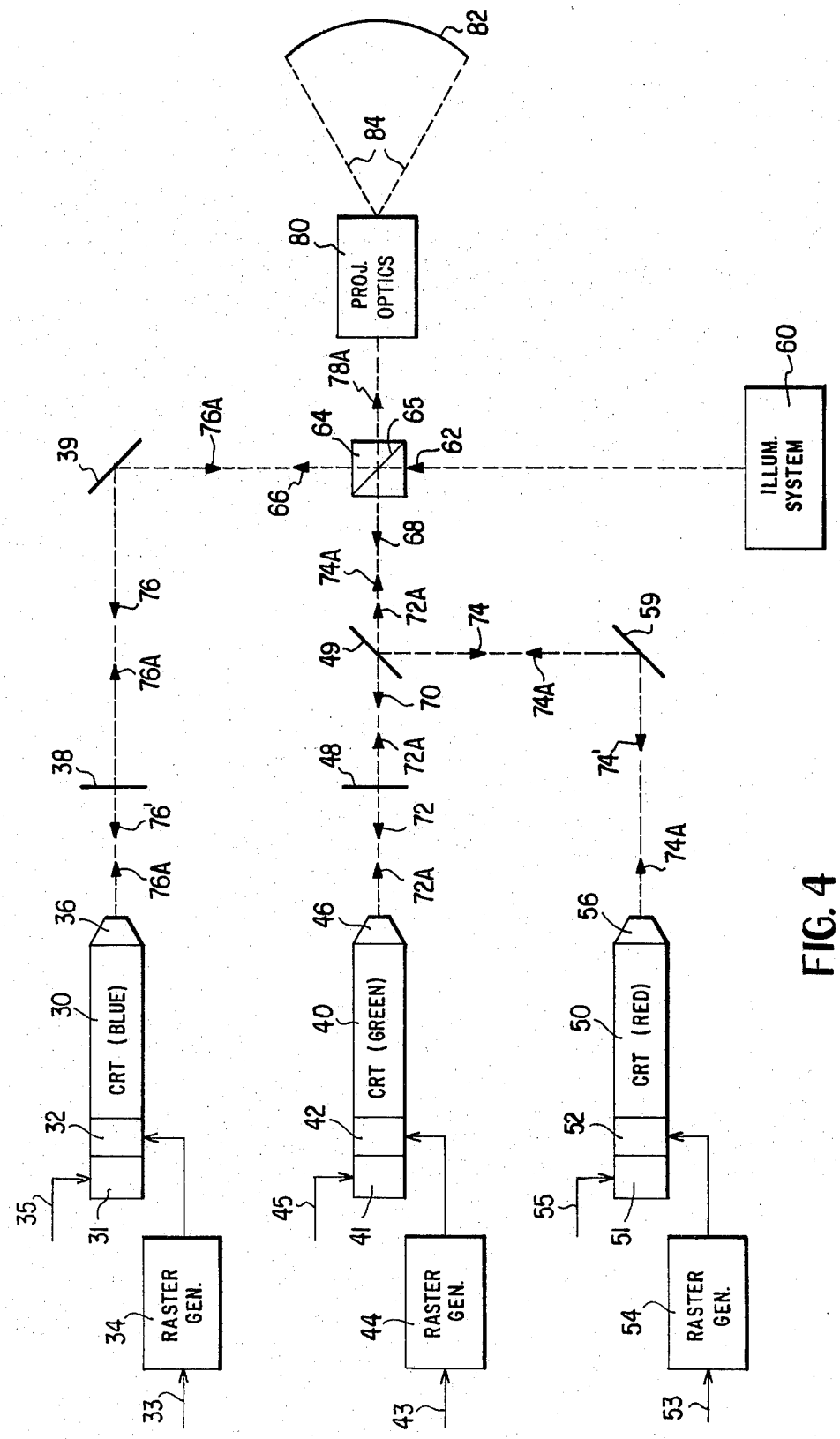
FIG. 4 illustrates a preferred embodiment of the present invention directed to a system for displaying a target in full color and in high resolution detail against a full color, low resolution background.

FIG. 4 illustrates a preferred embodiment of the present invention which permits the full color display of the target against a full color background, by using the same number of cathode ray tubes and associated light valves employed to display the background alone. Three cathode ray tubes, designated 30, 40 and 50 respectively, are used and each is dedicated to a different primary color. CRT 30 includes beam intensity control means 31 and beam deflection means 32. As explained above, the beam intensity control means determines the brightness produced by the CRT spot on the face of the tube. Signals limited to the primary blue color component of the full color image to be projected, are received on input 35 and applied to beam intensity control means 31. Beam deflection means 32 comprises either electrostatic or electromagnetic means for moving the beam in both the horizontal and in the vertical direction in accordance with the signals applied thereto from a raster generator 34. The raster generator may comprise a ramp circuit which applies a periodic sweep voltage to the beam deflection means. This causes the spot produced by the electron beam of the CRT to sweep periodically through successive horizontal scan lines, vertically spaced from each other to describe a raster pattern on the tube face.

The raster pattern laid down on the face of the CRT is dependent on the signals applied to raster generator input 33. The sweep angle of the CRT spot on the tube face can be controlled to produce a raster pattern of any desired size on the tube face. Further, the signal applied to raster generator input 33 controls the vertical spacing of the horizontal raster lines. It may also be desirable to interlace the writing of different portions of the image. For example, in order to reduce flicker of the image on the tube face, all odd lines of the raster may be written before the even lines are laid down. Likewise, the writing of a specific area (or areas) of the full image may be carried out in alternation with the writing of the remainder of the image. In all such cases, the control signals to carry out the desired action are applied by way of raster generator input 33.

Beam intensity control means and beam deflection means corresponding to those described above are associated with cathode ray tubes 40 and 50 and are designated by reference numerals 41, 42 and 51, 52 respectively. Inputs 45 and 55 are adapted to apply signals to intensity control means 41 and 51 respectively. Raster generators 43 and 54 are connected to beam deflection means 42 and 52 respectively and are themselves controlled from inputs 43 and 53 respectively.

Each of cathode ray tubes 30, 40 and 50 further has a liquid crystal light valve, designated 36, 46 and 56 respectively, associated therewith. Each light valve is coupled to the face of the CRT by means of fiber optics, such that incident light reflected by the light valve is modulated by the image on the tube face. Since each CRT is dedicated to one of the three primary colors, i.e. red, green or blue, a different primary color component of the image to be projected is modulated by each liquid crystal light valve onto the light beam reflected by such light valve.

In the apparatus of FIG. 4, the light incident on each light valve originates from an external light source, which may be a xenon lamp or an equivalent source of bright light that forms part of an illumination system 60. The latter further includes suitable optical means adapted to project a collimated beam of white light 62 onto a prism 64 which is positioned in the path of beam 62. Prism 64 is preferably a MacNeille type prism, which includes a thin polarizing film 65 positioned at a 45° angle to the incident light beam 62. The function of film 65 is to split the unpolarized, collimated, white light beam 62 into two polarized components 66 and 68 of white light, which have orthogonally complementary, linear polarization states, designated herein as the S and P state respectively.

The S-polarized beam component 66 continues in the path of incident beam 62 and strikes a blue dichroic mirror 39 positioned at a 45° angle thereto. Mirror 39 is adapted to pass all color components of white beam component 66, except primary blue. The primary blue component, designated by the reference numeral 76, is reflected at right angles to beam 66 to a blue trim filter 38. The function of filter 38 is to remove all non-blue color traces, such as may be present due to unwanted reflections or the like. The filtered beam, designated 76' in FIG. 4, emerges from trim filter 38 containing only blue light. It is polarized in one of the aforesaid two polarization states, e.g. the S polarization state.

P-polarized beam component 68 travels from prism 64 at right angles to beam 62. A red dichroic mirror 49 in the path of beam 68 is adapted to pass all color components other than red. The light passed by mirror 49, designated as beam 70 in FIG. 4, thus consists only of the blue and green color components of beam 68. Green trim filter 48 removes the blue color component from beam 70, leaving a P-polarized beam 72 which contains only green light.

When P-polarized beam component 68 strikes red dichroic mirror 49 at a 45° angle, a primary red beam 74 is reflected at right angles to incident beam 68. A second red dichroic mirror 59, positioned at 45° to the path of beam 74, changes the direction of beam 74 by 90°, the re-directed beam being designated 74' in FIG. 4. Mirrors 49 and 59 serve to eliminate all traces of non-red light. Thus, P-polarized beam 74' contains only red light.

As shown in FIG. 4., the geometry of the system is such that each of beams 76', 72 and 74' is directed to a corresponding light valve 36, 46 and 56 respectively, coaxial with the latter. Each beam is reflected along the same axis by the dielectric mirror which forms part of each light valve. The reflected beams are designated 76A, 72A and 74A respectively in the drawing. Each of the light valves is fiber-optically coupled to the face of its corresponding cathode ray tube. As explained above, the image on each tube face is controlled in accordance with a single color component of the full color image that is to be projected. Thus, each of reflected beams 76A, 72A and 74A is modulated by the variation of the corresponding color component of the full color image to be projected. Specifically, the S polarization of reflected beam 76A is modulated in accordance with the variation of the blue color component of the full color image. Similarly, the P polarizations of reflected beams 72A and 74A are modulated in accordance with the green and red color components respectively, of the aforesaid full color image. The reflected, polarization-modulated, blue beam 76A passes through blue trim filter 38 without change. Upon reflection by blue dichroic mirror 39, it changes direction by 90° and subsequently strikes prism 64.

Reflected, polarization-modulated, green beam 72A passes without change through green trim filter 48 and through dichroic reflector 49. Subsequent to reflector 49, beam 72A strikes prism 64.

Reflected, polarization-modulated, red beam 74A strikes red dichroic reflectors 59 and 49 in succession, each of which imposes a 90° change of direction on this beam, as shown in FIG. 4. Subsequent to reflector 49, beam 74A strikes prism 64.

Owing to their P-polarization state, (modulated by the green and red components of the final image), beams 72A and 74A pass through film 65 of prism 64 without change. On the other hand S-polarized beam 76A, whose polarization is modulated by the blue component of the final image, suffers a 90° change of direction upon reaching film 65. The combination of these three beams occurs in prism 64 and provides a full color beam 78A which is applied to an optical projection system 80. The latter projects a full color, magnified image 84 onto a projection screen 82, which represents the combination of the images on the respective faces of cathode ray tubes 30, 40 and 50. Thus, final image 84 displays the real time information contained in the signals which are separately applied to CRT inputs 35, 45 and 55 for each primary color.

As previously explained, signals are applied by each raster generator to the deflection means of the corresponding cathode ray tube in response to control signals received on raster generator inputs 33, 43 and 53. The signals so applied to the deflection means determine the vertical line spacing of the horizontal raster sweep lines, as well as the sweep angle and the number of raster lines which jointly determine the area of the raster. In the present invention these signals are used to write a high resolution mini-raster for portraying the target in a form that is differentiated from the low resolution base raster background of the target. Such an arrangement presents important advantages over a system wherein the target is displayed as an overlay on the existing base raster. Further, in the present invention the target colors are chromatically comparable to the background colors, i.e. both are displayed either in full color or monochromatically.

Figure 5:
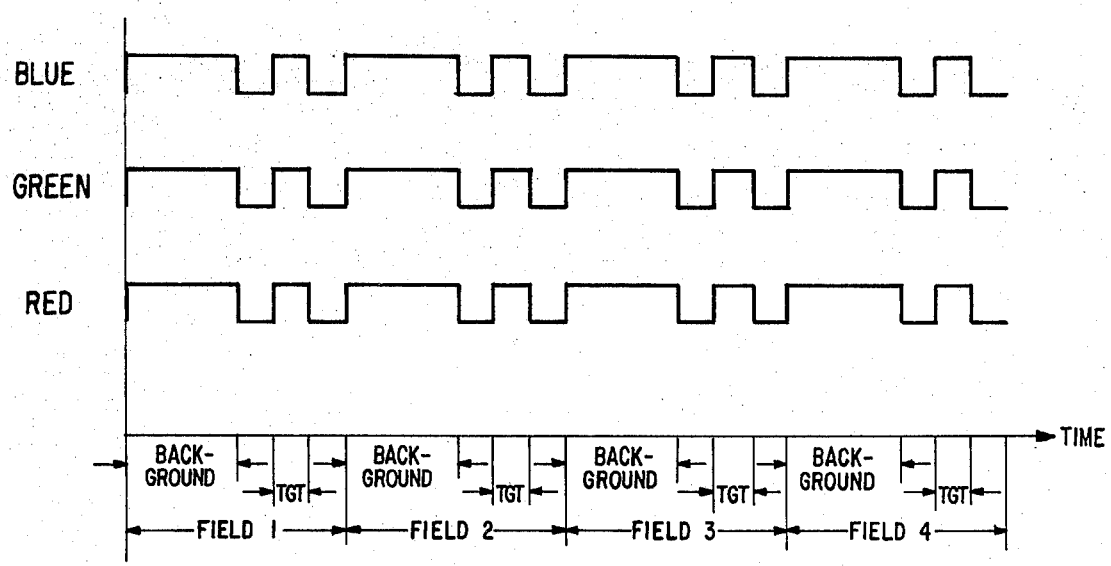
FIG. 5 is a timing diagram applicable to the operation of the apparatus of FIG. 4.

FIG. 5, is a timing diagram which illustrates the operation of the apparatus of FIG. 4. It will be understood that the lengths of the various time intervals shown are illustrative only and do not represent the true time relationships because of the scale factor involved. Each cathode ray tube has two separate operating phases per field interval, the latter defining a periodically occurring operating cycle. As shown, these operating phases occur in synchronism for all three cathode ray tubes. In a preferred embodiment of the invention, each CRT operates at 60 fields per second. During the first phase, which may have a duration on the order of 10 milliseconds, the background portion of the image is written using the low resolution base raster. This is followed by a rest interval on the order of 100 microseconds. During the second phase of the field interval, which may have a duration on the order of 6 milliseconds, the target portion of the image is written, using the high resolution mini-raster. This phase is again followed by a rest interval on the order of 100 microseconds to complete the field. The sequence of events described above repeats for each frame, in synchronism in all three cathode ray tubes. Thus, the target portion and the background portion of the image are alternately written on each tube face. Due to the persistence of the liquid crystal, the image on each tube face will show the mini-raster on which the target is portrayed as an inset on the base raster background.

Figure 6:
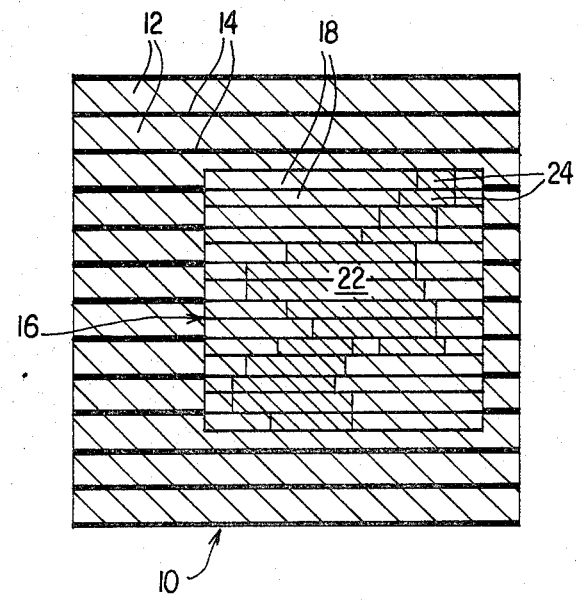
FIG. 6 illustrates the visual effect of the apparatus of FIG. 4 wherein a full color mini-raster is used to display the target against a full color background.

The combined action of the three cathode ray tubes shown in FIG. 4 and their associated light valves, is to project the target portion of the final image onto screen 82 in full color and in high resolution detail, differentiated from the low resolution, full color background portion of the final image. Both target and background are portrayed in real time. FIG. 6 illustrates the visual effect of so displaying the target. As shown, base raster lines 12 and intermediate spaces 14 have substantially the same dimensions as in FIG. 1. By way of example and without limitation, the coarse base raster line spacing may provide on the order of 1000 lines across the total height of the base raster. Mini-raster lines 18 and spaces 20 are likewise dimensioned in the manner shown in FIG. 1, providing, by way of example, a line spacing that is four times closer than that of the base raster. If the relative heights of the mini-raster and the base raster are 1:10, the mini-raster will contain 400 lines under the assumed conditions. It will be understood that the relative dimensions of the base and mini-rasters shown in the drawings are illustrative only and are not intended to represent the actual dimensions.

With the system under discussion, the mini-raster lines appears in full color, as is schematically indicated by the identical shading of lines 18 and base raster lines 12 in FIG. 6. The target, designated by the reference numeral 22, likewise appears in full color as well as in high-resolution detail. For the sake of illustration, the target is arbitrarily shaded for green in FIG. 6. That portion of the mini-raster which is not covered by the target displays the target background in full color and in high resolution detail. Outside the mini-raster, however, the base raster portrays the target background in full color, but in low resolution detail.

Figure 8:
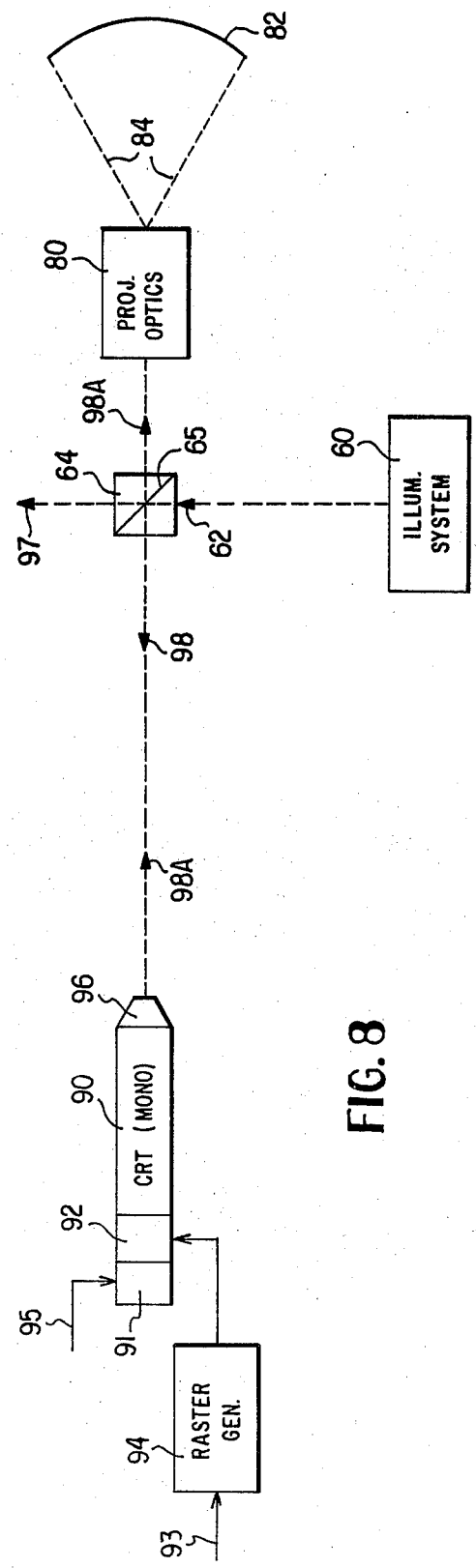
FIG. 8 illustrates still another embodiment of the present invention wherein a monochromatic mini-raster is used to display a target against a monochromatic background.

FIG. 8 illustrates a simplified version of the apparatus shown in FIG. 4, wherein the target is portrayed monochromatically in high resolution detail, on a monochromatically displayed low resolution background. Wherever possible, applicable reference numerals have been carried forward. As in the case of FIG. 4, the light source in illumination system 60 produces white light, which is applied as collimated beam 62 to prism 64. Upon striking film 65, beam 62 splits into two polarized component beams 97 and 98. In the present embodiment, beam 98 alone is used, being reflected at right angles to incident beam 62. As such, it is directed to light valve 96 which is optically coupled to cathode ray tube 90. Beam intensity control means 91 and beam deflection control means 92 of CRT 90 operate in a manner substantially identical to that explained in connection with FIG. 4. The beam intensity control means is responsive to input signals applied by way of an input 95 to determine the image that appears on the face of tube 90. Deflection control means 92 receives signals from raster generator 94 which, in turn, is controlled by the signals received on its input 93.

Beam 98, which may have a P polarization, is reflected by the dielectric mirror in liquid crystal light valve 96 in the manner discussed in connection with FIG. 4. The reflected beam, designated by the reference numeral 98A, is monochromatic in color. Its polarization is modulated in accordance with the image produced on the face of cathode ray tube 90, which is in turn controlled by the joint action of signals appearing on inputs 95 and 93. Reflected beam 98A passes through film 65 of prism 64, the latter being positioned on the same axis as cathode ray tube 90. Upon emerging from optical projection system 80, beam 98A projects a monochromatic, real time, magnified image 84 onto screen 82.

Figure 9:
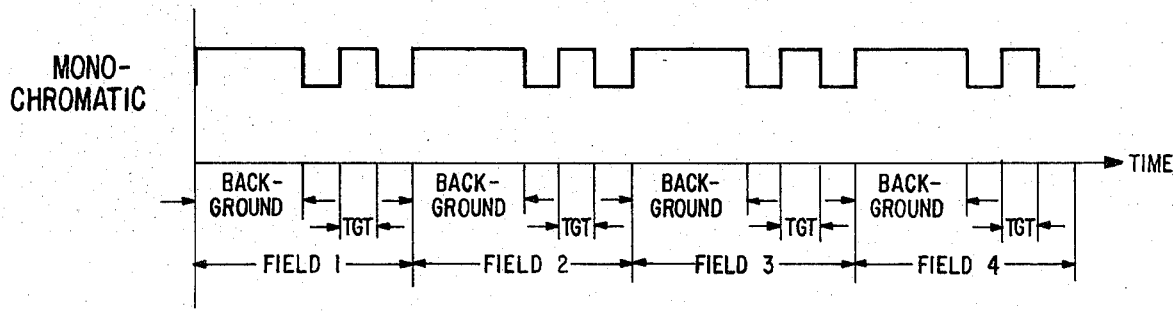
FIG. 9 is a timing diagram applicable to the operation of the apparatus of FIG. 8.

FIG. 9 illustrates the operation of the apparatus of FIG. 8, which is seen to be similar to that explained in connection with FIG. 5. Here again, the time interval lengths shown are illustrative only and do not represent the true time relationships. Specifically, the low resolution base raster signal is applied during the first phase of each field interval, having a duration on the order of 10 milliseconds. During this period monochromatic background information is written in low resolution detail on the face of cathode ray tube 90. After a rest interval of approximately 100 microseconds, the second phase of the field interval is initiated during which a high resolution mini-raster is applied for a duration on the order of 6 milliseconds, succeeded by another rest interval. The process repeats during successive field intervals, so that both the background and the target and refreshed during each field interval, i.e. every 1/60th of a second.

The resultant image projected onto screen 82 by the operation described, portrays the target monochromatically in high resolution detail, differentiated from the monochromatic low resolution background. As such, no false cues are produced by unnatural color contrasts. Accordingly, the system shown in FIG. 8 has important advantages over comparable prior art systems, while requiring only a single cathode ray tube and its associated light valve.

It will be clear from the foregoing discussion that the present invention lends itself to modification in a number of respects without departing from the basic principles thereof. For example, while FIG. 4 illustrates the geometry of a preferred arrangement in which a full color target is presented against a full color background, the invention is not so limited. For example, it is possible to arrange the various parts of the apparatus shown in FIG. 4 in a manner where only a single polarized light component is used after the collimated white light beam is split into its constituent, orthogonally complementary, polarized components. In the latter case, a pair of dichroic mirrors may for example be arranged on the same axis as beam 68, so as to subtract out the blue and green color components from beam 68. In such an arrangement, the light valve of the CRT dedicated to primary red is positioned on the same axis as beam 68, while the light valves of the two remaining CRT's are positioned to receive the green and blue color component respectively, separated from the white beam by the two dichroic mirrors. Other arrangements which are variants on the geometry shown and explained herein, may also be substituted without departing from the basic principles of the present invention.

As mentioned earlier, the invention lends itself to the portrayal of one or more separate targets in high resolution detail against a low resolution background. Where more than one target is to be portrayed, each of the frames shown in FIGS. 5 and 9 respectively, will have a separate time slot during the second phase of the operation for applying the mini-raster for each of the targets. In the case of the operation shown in FIG. 5, it will be clear that the operation of the respective cathode ray tubes must be synchronized for the time slot of each target.

While interleaving of time slots has been shown only for the background information and the target information, it is also possible to interleave the raster signals of the respective horizontal lines within each time slot, e.g. in order to reduce flicker on the projection screen which may otherwise be visible to the eye. Thus, when the base raster is written in each background time slot of FIG. 5 or 9, the odd and even base raster lines may be written in alternation. If so, the odd and even mini-raster lines are also written in alternation. Here again, when the full color system is used such interleaving must occur in synchronism for all colors.

From the foregoing discussion of the present invention, it will be clear that numerous modifications, variations, substitutions, and alternatives will now occur to those skilled in the art, all of which fall within the spirit and scope of the invention described and illustrated herein. Accordingly, it is intended that the invention be limited only by the scope of the claims appended hereto.

What is claimed is:

1. In an electro-optical light projection system for displaying an image in which at least one selected target is portrayed in a manner differentiated from its background;

said system comprising:
- at least one high resolution cathode ray tube including means for generating an electron beam, a tube face responsive to said electron beam to provide a visible light image thereon, beam deflection means and beam intensity control means;
- means for periodically applying base raster signals to said beam deflection means, said base raster signals being effective to cause said electron beam to scan through a base raster having a predetermined coarse spacing between successive base raster lines, said base raster covering at least the major portion of said tube face;
- means concurrently operative with the application of said base raster signals for applying first control signals to said beam intensity control means representative of background information;
- means for periodically applying mini-raster signals to said beam deflection means in alternation with said base raster signals, said mini-raster signals being effective to cause said electron beam to scan through a mini-raster having a predetermined close spacing between successive mini-raster lines, said mini-raster covering a restricted area within said base raster;

means concurrently operative with the application of said mini-raster signals for applying second control signals to said beam intensity control means representative of target information;

a source of collimated white light;

means for deriving polarized light from said collimated white light;

a liquid crystal light valve associated with said cathode ray tube and positioned to receive and reflect said polarized light, said light valve being responsive to the variable light image on said tube face modulate the polarization of the light beam reflected by said light valve;

a display screen; and means for projecting said polarization-modulated light beam onto said display screen;

whereby a magnified, real time image is provided on said screen adapted to display said target on said mini-raster in high resolution detail, differentiated from the low resolution background displayed by said base raster.

2. Apparatus in accordance with claim 1 wherein said liquid crystal light valve is fiber-optically couped to said tube face.

3. Apparatus in accordance with claim 2 wherein said means for deriving polarized light includes a prism adapted to split said collimated white light into a pair of orthogonally complementary linearly polarized beam components.

4. Apparatus in accordance with claim 3 wherein said target and said mini-raster are displayed monochromatically against a monochromatic background in said projected image.

5. Apparatus in accordance with claim 3 wherein said system comprises three substantially identical cathode ray tubes each having a separate liquid crystal light valve fiber-optically coupled to the tube face thereof;

means for splitting said polarized light into three different primary color light beams each directed to a different one of said light valves;

means for synchronously applying said base raster signals to the beam deflection means of each of said three cathode ray tubes alternately with said mini-raster signals;

means for alternately applying a separate one of said first control signals and of said second control signals respectively in synchronism to the beam intensity control means of each of said three cathode ray tubes, said first and second control signals being applied to said three cathode ray tubes concurrently with the application of said base raster signals and said mini-raster signals respectively;

each of said first control signals being representative of background information limited to a different primary color; and each of said second control signals being representative of target information limited to the same primary color as the corresponding first control signals applied to the same cathode ray tube;

whereby said target and said mini-raster are portrayed in full color against a full color background.

6. In an electro-optical light projection system for displaying an image in which at least one selected target is portrayed in a manner differentiated from its background;

said system comprising:

a source of collimated white light;

means for deriving three polarized light beams from said collimated white light each having a different primary color;

first, second and third high resolution cathode ray tubes;

each of said cathode ray tubes including means for generating an electron beam, a tube face responsive to said electron beam for producing a visible light image thereon, beam deflection means and beam intensity control means;

means for periodically applying base raster signals in synchronism to respective ones of said beam deflection means, each of said base raster signals being effective to cause the corresponding electron beam to scan through a base raster having a predetermined coarse spacing between successive base raster lines, said base raster covering at least the major portion of said tube face;

means concurrently operative with the application of said base raster signals for applying first control signals in synchronism to respective ones of said beam intensity control means, each of said first control signals being representative of background information limited to a different primary color;

means for periodically applying mini-raster signals in synchronism to respective ones of said beam deflection means in alternation with said base raster signals, each of said mini-raster signals being effective to cause the corresponding electron beam to scan through a mini-raster having a predetermined close spacing between successive mini-raster lines, said mini-raster covering a restricted area within said base raster;

means concurrently operative with the application of said mini-raster signals for applying second control signals in synchronism to respective ones of said beam intensity control means, each of said second control signals being representative of target information limited to the same primary color as the corresponding first control signals applied to the same cathode ray tube;

a separate liquid crystal light valve fiber-optically coupled to each of said tube faces, each of said light valves being positioned to receive and reflect a separate one of said primary color polarized light beams, each of said light valves being responsive to the variable light image on the tube face coupled thereto to modulate the polarization of the primary color light beam reflected by said light valve;

means for combining said reflected, primary color light beams into a single, full color light beam;

a display screen; and means for projecting said full color light beam onto said display screen;

whereby a magnified, real time image is provided on said screen adapted to display said target on said mini-raster in full color, high resolution detail, differentiated from the full color, low resolution background displayed by said base raster.

7. Apparatus in accordance with claim 6 wherein said means for deriving three polarized primary color light beams comprises:

a prism adapted to provide a pair of light beam components having different states of light polarization; and a combination of color-specific dichroic mirror means and color-specific trim filter means jointly adapted to split at least one of said polarized light beam components to derive said three beams having different primary colors.

8. Apparatus in accordance with claim 7 wherein said prism further comprises said beam combining means.

9. Apparatus in accordance with claim 6 wherein said means for deriving three polarized light beams having different primary colors and said beam combining means comprise:
- a prism positioned in the light path of said source, said prism being adapted to split said collimated white light into a pair of orthogonally complementary, linearly polarized beam components;
- blue dichroic mirror means positioned in the path of a first one of said polarized beam components for separating a polarized blue beam therefrom;
- a first one of said light valves being positioned coaxial with the path of said polarized blue beam to receive the latter;
- a blue trim filter positioned between said blue dichroic mirror and said first light valve adapted to admit only substantially pure primary blue light to the latter valve;
- a first red dichroic mirror positioned in the path of the other one of said polarized beam components for separating a pair of mutually orthogonal beams therefrom consisting substantially of polarized blue and green light and of polarized red light respectively;
- a second one of said light valves being positioned coaxial with the path of said polarized blue and green beam to receive the latter;
- a green trim filter positioned between said first red dichroic mirror and said second light valve adapted to admit only substantially pure primary green light to the latter valve;
- a second red dichroic mirror positioned in the path of said red beam and adapted to re-direct the latter, said second red mirror being adapted to reflect only substantially pure primary red light;
- a third light valve positioned coaxial with the path of said re-directed red beam to receive the latter; and
- said prism being further adapted to combine said reflected primary color light beams to provide said single full color light beam.

10. A method for using a high-intensity source of collimated white light in association with at least one high resolution cathode ray tube and a liquid crystal light valve fiber-optically coupled to the face of said tube to display an image on a display screen wherein at least one selected target is portrayed in a manner differentiated from its background;
said method comprising the steps of:
- periodically applying base raster signals to said cathode ray tube effective to cause the electron beam thereof to scan through a base raster on the face of said tube, said base raster having a predetermined coarse spacing between successive base raster lines and covering at least the major portion of said tube face;
- applying first control signals to said cathode ray tube concurrently with the application of said base raster signals, said first control signals being adapted to control the intensity of said electron beam in accordance with information representative of said background;
- periodically applying mini-raster signals to said cathode ray tube in alternation with said base raster signals, said mini-raster signals being effective to cause said electron beam to scan through a mini-raster on said tube face having a predetermined close spacing between successive mini-raster lines and covering a restricted area within said base raster;
- applying second control signals to said cathode ray tube concurrently with the application of said mini-raster signals, said second control signals being adapted to control the intensity of said electron beam in accordance with information representative of said target;
- deriving polarized light from said collimated white light;
- directing said polarized light to said light valve for reflection therefrom;
- modulating the polarization of the light beam reflected from said light valve in accordance with the variable light image provided on said tube face; and
- projecting said polarization-modulated light beam onto said display screen;
- whereby a magnified, real time image is provided on said screen to display said target on said mini-raster in high resolution detail, differentiated from the low resolution background displayed by said base raster.

11. The method in accordance with claim 10 wherein said target and said mini-raster are displayed monochromatically on said screen against a monochromatic background.

12. The method in accordance with claim 10 wherein at least three substantially identical cathode ray tubes are used each having a separate liquid crystal light valve fiber-optically coupled to the tube face thereof;
- said base raster signals being applied in synchronism to said three cathode ray tubes alternately with the synchonous application of said mini-raster signals;
- said first control signals being applied in synchronism to said three cathode ray tubes, each of said first control signals being representative of background information limited to a different primary color;
- said second control signals being applied in synchronism to said three cathode ray tubes, each of said second control signals being representative of target information limited to the same primary color as the corresponding first control signals applied to the same cathode ray tube;
- deriving three polarized light beams having different primary colors from said polarized light, each of said last-recited light beams being directed to a different one of said light valves for reflection therefrom as a polarization-modulated primary color light beam; and
- combining said polarization-modulated primary color light beams into a single, full color light beam for projection onto said screen;
- whereby said target and said mini-raster are displayed in full color on said screen against a full color background.

* * * * *